(12) United States Patent
Zhou et al.

(10) Patent No.: US 10,040,306 B2
(45) Date of Patent: Aug. 7, 2018

(54) PRINTABLE FILM (71) Applicant: Hewlett-Packard Development Company, L.P., Houston, TX (US)

(72) Inventors: Xiaoqi Zhou, San Diego, CA (US); Francois K. Pirayesh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/564,400

(22) PCT Filed: Jul. 9, 2015

(86) PCT No.: PCT/US2015/039657
§ 371 (c)(1),
(2) Date: Oct. 4, 2017

(87) PCT Pub. No.: WO2017/007478
PCT Pub. Date: Jan. 12, 2017

(65) Prior Publication Data
US 2018/0134057 A1     May 17, 2018

(51) Int. Cl.
| | |
|---|---|
| *B41M 5/00* | (2006.01) |
| *B41M 5/41* | (2006.01) |
| *B41M 5/52* | (2006.01) |
| *G03C 8/52* | (2006.01) |
| *B41M 5/50* | (2006.01) |

(Continued)

(52) U.S. Cl.
CPC .............. *B41M 5/41* (2013.01); *B41M 5/502* (2013.01); *B41M 5/506* (2013.01); *B41M 5/508* (2013.01); *B41M 5/5218* (2013.01); *B41M 5/5227* (2013.01); *B41M 5/5254* (2013.01);
(Continued)

(58) Field of Classification Search
CPC ...... B41M 5/502; B41M 5/506; B41M 5/508; B41M 5/5218; B41M 5/5227
See application file for complete search history.

(56) References Cited

U.S. PATENT DOCUMENTS

| | | |
|---|---|---|
| 5,635,278 A | 6/1997 | Williams |
| 5,716,681 A | 2/1998 | Williams |

(Continued)

FOREIGN PATENT DOCUMENTS

| | | |
|---|---|---|
| CN | 203093359 U | 7/2013 |
| EP | 1459901 | 9/2004 |

(Continued)

OTHER PUBLICATIONS

International Search Report and Written Opinion for International Application No. PCT/US2015/039657 dated May 4, 2016, 11 pages.

*Primary Examiner* — Betelhem Shewareged
(74) *Attorney, Agent, or Firm* — HP Inc. Patent Department (57) ABSTRACT

A printable film that contains a polymeric film substrate with a front side and a backside. The printable film contains also a light diffusion layer and an image receiving layer. The light diffusion layer is applied on the backside of the polymeric film substrate and contains inorganic particles, dispersing agents and polymeric binders. The image receiving layer is applied over the light diffusion layer on the backside of the polymeric film substrate. Also disclosed herein is the method for obtaining the printable film.

15 Claims, 2 Drawing Sheets

(51) Int. Cl.
*C08J 7/04* (2006.01)
*G03C 1/795* (2006.01)

(52) U.S. Cl.
CPC ............. *B41M 5/5281* (2013.01); *G03C 8/52* (2013.01); *C08J 7/042* (2013.01); *G03C 1/7954* (2013.01)

(56) References Cited

U.S. PATENT DOCUMENTS

| | | | |
|---|---|---|---|
| 5,753,589 A | 5/1998 | Takao et al. | |
| 5,883,607 A | 3/1999 | Williams | |
| 5,910,359 A | 6/1999 | Kobayashi et al. | |
| 6,214,458 B1 | 4/2001 | Kobayashi et al. | |
| 6,436,219 B1 | 8/2002 | Francis et al. | |
| 6,455,136 B1 * | 9/2002 | Okajima ................ B41M 5/506 428/32.1 |
| 6,468,641 B2 | 10/2002 | Rakos et al. | |
| 6,641,973 B1 | 11/2003 | Dontula et al. | |
| 6,896,941 B1 | 5/2005 | Yoshida et al. | |
| 7,238,644 B2 | 7/2007 | Yukawa et al. | |
| 8,470,415 B2 | 6/2013 | Simpson et al. | |
| 8,563,100 B1 | 10/2013 | Zhou et al. | |
| 2003/0157278 A1 | 8/2003 | Takahashi et al. | |
| 2007/0166486 A1 | 7/2007 | Kubota et al. | |
| 2008/0299324 A1 | 12/2008 | Naisby et al. | |
| 2011/0180224 A1 * | 7/2011 | Kozuka ................ D21H 19/36 162/136 |
| 2013/0201251 A1 | 8/2013 | Pal et al. | |
| 2013/0243977 A1 * | 9/2013 | Zhou ..................... B41M 5/504 428/32.11 |
| 2014/0044897 A1 | 2/2014 | Zhou et al. | |
| 2016/0144644 A1 * | 5/2016 | Zhou ..................... B41M 5/502 428/32.25 |

FOREIGN PATENT DOCUMENTS

| | | |
|---|---|---|
| GB | 2410705 | 8/2005 |
| JP | H11309942 | 11/1999 |
| JP | 2003300377 | 10/2003 |
| WO | WO9404601 | 3/1994 |
| WO | WO03029015 | 4/2003 |
| WO | WO2014011141 | 1/2014 |
| WO | WO2015038108 | 3/2015 |

* cited by examiner

PRINTABLE FILM

BACKGROUND

Inkjet printing is a non-impact printing method in which an electronic signal controls and directs droplets or a stream of ink that can be deposited on a variety of substrates. Current inkjet printing technology involves forcing the ink drops through small nozzles by thermal ejection, piezoelectric pressure or oscillation, onto the surface of a media. This technology has become a popular way of recording images on various media surfaces for a number of reasons, including low printer noise, capability of high-speed recording and multi-color recording. Inkjet web printing is a technology that is specifically well adapted for large format printing.

Large format inkjet printing application covers, for examples, from wall coverings to signs, banners, and the like with the images in a form of designs, symbols, photographs, and/or text. Some inkjet large format applications, like for examples illuminated signboard, are using a specific media also called printable film. With these printing technologies, it is apparent that the image quality of printed images is strongly dependent on the construction of the film media used.

BRIEF DESCRIPTION OF THE DRAWING

The drawings illustrate various embodiments of the printable film and are part of the specification.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percent are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure relates to printable film that comprises a polymeric film substrate with a front side and a backside, a light diffusion layer, applied on the backside of the polymeric film substrate, which contains inorganic particles, dispersing agents and polymeric binders and an image receiving layer applied over the light diffusion layer on the backside of the polymeric film substrate. Also disclosed herein is a method for forming a printable film.

By the expression "printable film", it is meant herein a film or media which can be printed thereon using an ink, i.e. a film of which the surface layer can accept in to produce an image with good printing quality. The surface layer of the film will be strong enough to resist any physical action to pull of inks such scratching, wiping and rapping. A printable film media or film substrate may need to have the specific properties, such has for examples, being transparent or translucent by comparison to other type of media.

In addition, a film media or film substrate will be considered a thin film: in some examples, the printable film has a thickness that is comprised between 80 micrometers (80 µm) and 250 micrometers (250 µm).

The printable film is of the present disclosure is a digitally printable film. It mean thus that the film is specifically designed to receive any digital printable ink and toners, such as, for example, inkjet printing inks, electrophotographic printing toners and electrophotographic printing liquid toners. In some examples, the printable film is an inkjet printable film that can support ink such as organic solvent-based inkjet inks or aqueous-based inkjet inks Examples of inkjet inks that may be deposited, established, or otherwise printed on the printable substrate, include pigment-based inkjet inks, dye-based inkjet inks, latex-based inkjet inks and UV curable inkjet inks. In some examples, the printable film is very well adapted to latex-based inkjet inks.

In some examples, the printable film is designed to be used in backlit display applications. The printable film is a backlit display film which means that the film is very well adapted for backlit display application in which the film provides uniform light transmission while maintaining the same strength of illumination at all points over the area of the display. By "backlit display applications", it is meant herein a media that has been designed, very often in a form of wide format, or large format, for being used in many public places both indoors and outdoors. Such backlit display applications includes, for examples illuminated signboards, that can be used for delivering messages with high visibility both during the day and at night. Illuminated signs and signboards have been used, for examples, for general advertising which necessitate more complex images of higher visual impact and, for examples, for message or general advertising which involve that the content be changed from time to time. The printable film that is going to be used in backlit display application should meet several requirements. The degree of light transmission of the media should be adapted appropriately: if the material is too opaque, the light intensity transmitted is limited and the image will appear dull and the colors will lose their vibrancy. However, on the same time, if the film is too transparent, the light source coming from the backside of the media (such as incandescent bulbs, fluorescent tubes or LED matrix, for examples), in backlit display box, can interference the image and made a poor display quality. In some examples, the printable film will contain some degree of opacity but will maximally transmit lighting, in a manner of highly diffusing illumination lighting.

In some examples, the printable film is a back-print backlit display film. By "back-print" it is meant herein that the image will be printed on the back-side of the film. In some other examples, the film is a "high gloss" back-print backlit display film meaning thus that the film has a gloss which is greater than 98% at 20 degree view angle. The gloss level is evaluated using spectrophotometer (such as the X-Rite i1/i0) and single-angle gloss-meter (such as the BYK Gloss-meter).

In some examples, a backlit display comprises a translucent or transparent printable film and a frame. The printable film, as defined herein, will bear the printed information and should be mounted in front of a light source. The frame contains a light source at the back, which can be any lighting objective such as LED, incandescent bulbs or fluorescent tubes. The frame holds the printed image that is deposited on the front side of the printable film such as described herein.

The printable film of the present disclosure can be used in both backlit and frontlit display application, meaning thus that the image printed on the film can be seen from both sides of the media and even if there is no back illumination like in backlit application. In some examples, when back illumination is off, and front light or daytime sun light is projected on the non-printed surface, the front surface of the film works as gloss amplifier in order to make observer seeing a very high gloss image through the film. Under such circumstance, the printable film of the present disclosure functions as a very high gloss frontlit material. In some other examples, when back illumination lighting is on, the observer can see a very high glossy and color-vivid backlit image from the front side. This configuration provides a very good protection for printed image being mechanical scratched and also being protected from light fading.

The printable film of the present disclosure has very good printing characteristics and durability performances. In addition, the printable film is a translucent or transparent film, or a semi-translucent or semi-transparent film which means that film allows the light to diffuse thought it. As good printing characteristics, is it meant herein that the printed image has a good black optical density, a good color gamut and a good sharpness. The images printed on the printable film will thus be able to impart excellent image quality: vivid color, such as higher gamut and high color density. High print density and color gamut volume are realized with substantially no visual color-to-color bleed and with good coalescence characteristics. In addition, the printable film of the present disclosure exhibits an excellent gloss.

The images printed on the printable film will have excellent durability; specifically, it will have excellent durability under mechanical actions such as rubbing and scratching since small damage to the film, such as, for example, a tiny scratching line might become a very apparent defect under the illumination of back lights, when the film is used in backlit display applications.

In some examples, the printable film of the present disclosure, when used in backlit display applications, will have the ability to uniformly distribute light sourced from the back of the media. The media should then be able to diffuse the "point lighting" at back light source to make the light transmission very uniformly across the media for high quality images.

Figure 1:
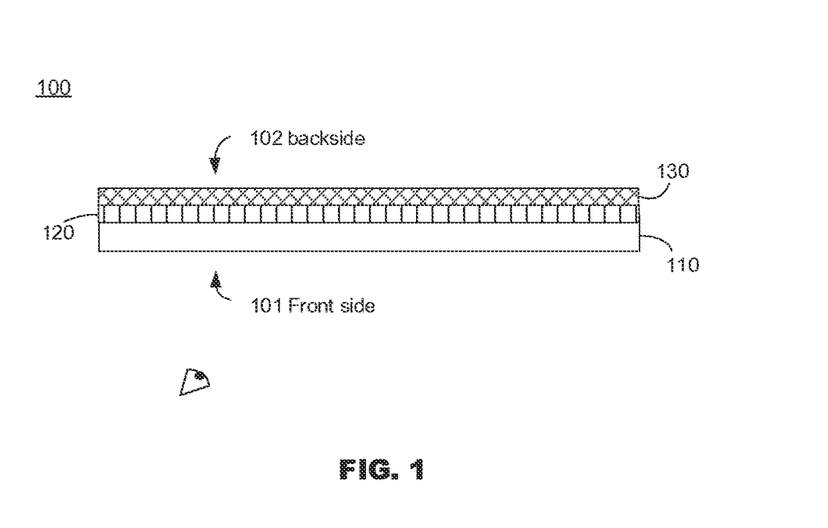
FIGS. 1 and 2 are cross-sectional views of the printable film according to embodiments of the present disclosure.

FIG. 1 illustrates the printable film (100), or film medium (100), as described herein. The printable film (100) has two sides: a front side (101) and a backside (102). The front side (101) will be the side from where the viewer will look at the printed article. The backside (102) is the opposite side of the front side (101). The front side (101) of the printable film is a high gloss smooth surface that is facing to observer. No coating layer is applied to the front side. The printable film (100) encompasses a base film substrate (110), a light diffusion layer (120) and an image receiving layer (130). As showed in FIG. 1, the light diffusion layer (120) and the image receiving layer (130) are applied to the backside (102) of the media.

Figure 2:
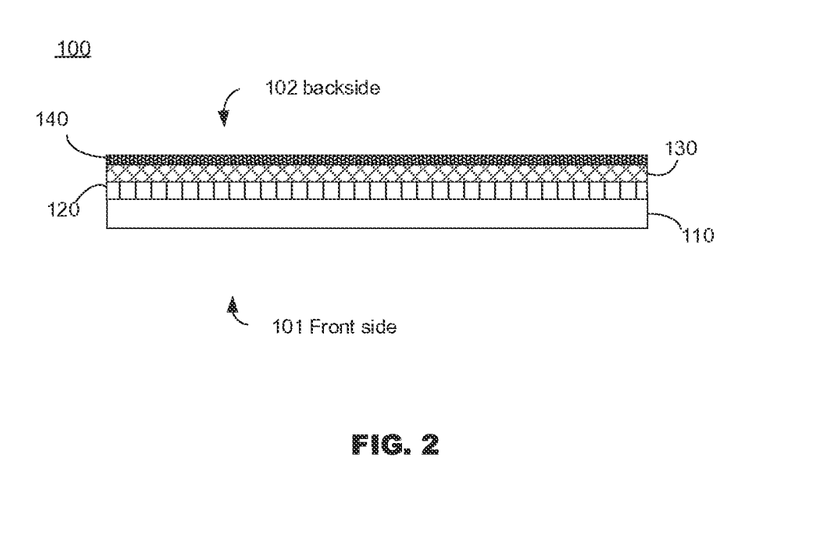

FIG. 2 illustrates a printable film (100) that has been printed, which mean that the printable film comprises a printed image (140) that has been printed over the image receiving layer (130) applied to the backside (102) of the media. Such printed image (140) can be considered as a mirror-reflected reversed image that is printed on the top of image receiving layer (130). In some examples, the printed image contain a latex based-ink.

Figure 3:
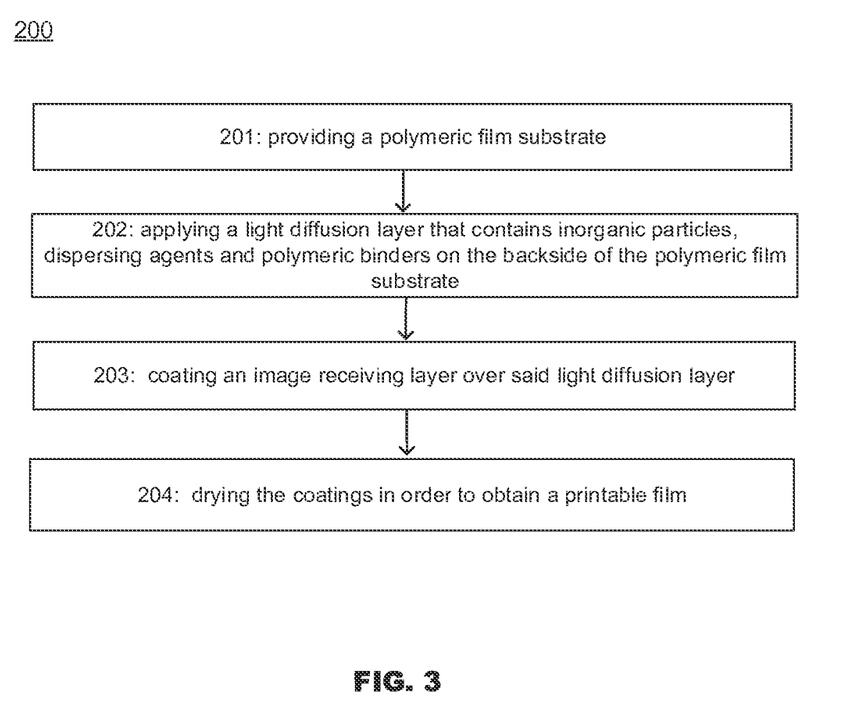
FIG. 3 is a flow chart of a method for making a printable film in accordance with an example of the present disclosure.

FIG. 3 is a flow chart of a method for making a printable film, where a light diffusion layer that contains inorganic particles, dispersing agents and polymeric binders, is applied on the backside of a polymeric film substrate, and where an image receiving layer is coated over the light diffusion layer in order to obtain a printable film as described herein.

In some examples, the light diffusion layer (120) is disposed over the base film substrate (110), on the backside (102) of the film substrate, at a coat-weight in the range of about 0.1 to about 20 gram per square meter (g/m$^2$ or gsm), or in the range of about 0.5 gsm to about 15 gsm, or in the range of about 1 to about 10 gsm. In some other examples, the image receiving layer (130) is disposed on the light diffusion layer (120), at a coat-weight in the range of about 0.1 to about 40 gram per square meter (g/m$^2$ or gsm), or in the range of about 1 gsm to about 15 gsm, or in the range of about 3 to about 10 gsm.

The present disclosure refers also to a printable recording media having a polyethylene terephthalate base film substrate with a tie layer which is a copolymer emulsion of butyl acrylate-ethyl acrylate and that has been through a corona treatment, a light diffusion layer, and an image receiving layer applied over the light diffusion layer on the backside of the base film.

The Polymeric Film Substrate

The printable medium (100) comprises a base polymeric film (110) or polymeric film substrate. In some examples, the polymeric film substrate (110) is a non-porous base substrate. The base film substrate (110) is a polymeric base film substrate, meaning thus that it contains at least a polymeric compound. There is no specific limitation on the selection of substrate, as long as that material is substantially optically clear or has right opacity to receive printing image. The substrate has to have good mechanical strength for later coating processing and end application. Some print processing request heated curing such as inkjet latex printing. The substrate may thus be able to withstand the temperature up to 130° C. without significant shrinkage, softening and curing.

The base film substrate (110) contains polymeric substances. Such polymeric substance can be made of organic synthetic high molecular compound. In some examples, the polymeric substances are poly-alkene compounds. By poly-alkene compound, it is meant herein that the polymeric substances is made, for instance, from a poly-alkene homopolymer, a poly-alkene copolymer, a modified poly-alkene, a combination of two or more of the above-listed poly-alkenes, or a mixture of two or more thereof. By definition, a "poly-alkene" herein refers to a polymeric material formed via polymerization of an alkene monomer, i.e., $C_nH_{2n}$, and its derivatives, where n is within a range of about 7,000 to about 20,000. Examples of the polymers used to make the polymeric particles include, but are not limited to, polyethylene homopolymer, polypropylene homopolymer, polytetrafluoroethylene (PTFE), polyamide, amide-modified polyethylene, amide-modified polypropylene, PTFE-modified polyethylene, PTFE-modified polypropylene, maleic anhydride-modified polyethylene, maleic anhydride-modified polypropylene, oxidized polyethylene, oxidized polypropylene, chloride polyethylene, chloride polypropylene, a combination of two or more of the above-listed poly-alkenes, or a mixture of two or more of the above-listed poly-alkenes.

Examples of the other materials that can be used as polymeric substance includes, but are not limited to, cellulose acetate butyrate, cellulose acetate propionate, polyether sulfone, polymethyl methacrylate, polyurethane, polyolefin film (such as polyethylene and copolymers), polypropylenes and copolymers, polyesters (such as polyethylene terephthalate and Biaxially-oriented polyethylene terephthalate), Modified PET (such as replace ethylene glycol by cyclohexane dimethanol (CHDM), or replacing terephthalic acid with isophthalic acid). The polymeric substances can be polyethylene terephthalate (PET), polytetrafluoroethylene (PTFE), polyamide or polyethylene polymers. The polymeric substances can also be polytetrafluoroethylene (PTFE), polyamide or polyethylene polymer. Examples of PET film that can be used are commercially available product such as DuPont Teijin Films™ Melinex® and Mylar® polyester film.

In some examples, the base polymeric film substrate (110) is a polyethylene terephthalate (PET) base film substrate. In some other examples, the base film substrate is made of unfilled polyethylene terephthalate with a transparent or a semi-transparent appearance. The wording "unfilled" refers to the fact that there is no filler particles pre-compounding into the resin matrix before filming. The wording "transparent" or "semi-transparent" refer herein to the ability of the substrate to let the light going through. The substrate of the printable film may be described herein at least in terms of its transparency. As used herein, the transparency of the substrate refers to the penetrability of the substrate to visible light. As such, a transparent or translucent substrate is not opaque.

The base polymeric film substrate (110) may further comprise a tie layer. Without being linked by any theory, it is believed that this tie layer is able to provide better adhesion between the film substrate (110) and a subsequent material layer applied thereon. The tie layer may be a polymeric material with a surface free energy that is higher than the surface free energy of the synthetic polymeric film, for example a surface free energy that is greater than 30 milliNewton per meter (mN/m), as measure at 20° C. In some examples, the polymeric material of the tie layer has a surface free energy that is greater than 35 mN/m, or greater than 38 mN/m, or greater than 40 mN/m. Examples of polymeric material of the tie layer include, but are not limited to, various polyacrylates, various polymethyacrylates, polyethyleneoxide, polyvinyl alcohol, polyethyleneterephtalate, polyamide, polycarbonate, polystyrene, polychloropene, polyoxyethylene, polystyrene, poly(2-vinyl pyridine), epoxy resins, a combination of two or more of these materials, or a mixture of two or more of these materials. In some examples, the polymeric material of the tie layer is a copolymer emulsion of butyl acrylate-ethyl acrylate.

An amount of the tie layer material on the base substrate (110) may be within a range of about 0.01 grams per square meter (gsm) to about 5 gsm. In some examples, the amount of the tie layer material applied over the base substrate (110) is within the range of about 0.1 gsm to about 5 gsm, or about 0.3 gsm to about 4 gsm, or about 0.5 gsm to about 3 gsm. The thickness of the tie layer can be in the range of about 0.01 to about 5 micro-meters ($\mu m$, $10^{-6}$ m) or in the range of about 0.2 to about 0.5 micro-meters ($\mu m$, $10^{-6}$ m).

In some examples, before apply any coating to the base layer, a corona treatment may be done in order to improve surface polarity. The base layer can thus be pre-treated in corona chamber at room temperature and atmosphere. During the corona treatment, polar groups such as hydroxyl, ketone and carboxyl groups can be grafted onto the film. In another implementation, the base layer can be pre-washed with a $H_2SO_4$ solution or other oxidant solutions of 30-50% concentration by weight to "oxidize" and "etch" the surface to reduce its hydrophobicity.

The Light Diffusion Layer

The printable film comprise a light diffusion layer (120) that is applied on the backside (102) of the polymeric film substrate as the supporting substrate (110). The light diffusion layer contains inorganic particles, dispersing agents and a polymeric binder. In some examples, the light diffusion layer can comprises a primary inorganic particles. In some other examples, the light diffusion layer can further comprise a second type of the particles, or secondary particles, in addition to the primary inorganic particles. The light diffusion layer can contain at least two different type of inorganic particles, a primary inorganic particles and a secondary particle, a dispersing agent and a polymeric binder. Without being linked by any theory, it is believe that the function on of this layer is to maximally and uniformly diffuse the back lights and, also, to maximally pass the light across ink film and media.

The coating thickness of the light diffusion layer plays an important role to compromise the conflicting diffusion and transparence. The optimum coating thickness is depending upon the type and amount ratio of the particles described above. In some examples, the thickness of the light diffusion layer is ranging from about 0.01 nanometers (nm) to about 10 micrometer ($\mu m$); or from about 0.001 micrometer ($\mu m$) to about 5 micrometer ($\mu m$); out of the top surface of the base film substrate. In some other examples, the coat weight of the light diffusion layer can be ranging from about 0.5 gsm to about 15 gsm, or from about 1 gsm to no more than 10 gsm, for example from 5 to 8 gsm.

The light diffusion layer should have an appropriate opacity: indeed, a high opacity will give good diffusion performances but will decrease media transparence, whereas high transparence may bring ununiformed light distribution. In some examples, the light diffusion layer will have an opacity that is ranging from about 50 to about 95, or from about 60 to about 90, or from about 68 to about 82. The opacity is tested using TAPPI test method T425 (The opacity is expressed herein in percentage %).

In some examples, the light diffusion layer comprises, at least, two kinds of particles that are scattering the lights. As used therein, the wording "scattering" is defined for compounds, such as particles, which can change the direction of light when they have a different refractive index from other components in the layer, resulting in a light scattering effect. The light scattering effect can makes the film opaque with white color and can provide hiding power to the coating. Light scattering effect can also diffuse the non-uniformity of lighting source from light box. In some examples, the first type of the particles, or primary particles, have a high refractive index that is, at least, greater than 1.8; or that is at least greater than 2.0.

Thus, in some examples, the light diffusion layer (120) encompasses a first type of inorganic particles, or primary particles, having a refractive index (n) that is superior or equal to 1.8. In some other examples, the refractive index (n) of the inorganic particles is in the range of about 2.0 to about 3.0. The refractive index, or index of refraction, of inorganic particles is a measure of the speed of light in particles. It is expressed as a ratio of the speed of light in vacuum relative to that in the particles medium.

The inorganic particles can be metal oxides or complex metal oxides particles. As used herein, the term "metal oxide particles" encompasses metal oxide particles or the water insoluble metal salt particles. The metal oxide particles are particles of metal oxide that have high refractive index (i.e. more than 1.8). In some examples, the first type of the particles, or primary particles are rutile and anatase titanium dioxide particles ($TiO_2$) with refractive index that is higher than 2.5. The average particle size or equivalent particle size distribution D50 of the first type of the particles, or primary particles can be in the range of about 500 to about 600 nm. The D50 particle size is determined using a Malvern Zetasizer Nano (Malvern Instruments, Malvern, Worcestershire UK) when the sample is diluted at 1:1000 ratio in pure triethyleneglycol divinyl ether. Particle Size Distribution D50 is also known as the median diameter or the medium value of the particle size distribution, it is the value of the particle diameter at 50% in the cumulative distribution. For example, if D50 is 600 nm, then 50% of the particles in the sample are larger than 600 nm, and 50% are smaller than 600 nm. D50 can be used to represent the particle size of group of particles. In some other examples, the first type of the particles, or primary particles, have a particle size range which can maximally scatter the visible light in a wavelength range of $\lambda \approx 400-800$ nm.

Non limiting examples of first type of inorganic particles, or primary particles, that are part of the light diffusion layer (120), are materials such as aluminum oxide, aluminum phosphate, nanocrystalline boehmite alumina (AlO(OH)), beryllium oxide, dysprosium oxide hafnium(IV) oxide, lutetium oxide, scandium oxide, tantalum pentoxide, tellurium dioxide, titanium dioxide, zinc oxide, zirconium dioxide, barium titanate calcium molybdate, calcium tungstate, gallium arsenide oxide, gallium antimonide, oxide potassium niobate, potassium tantalate, potassium titanyl phosphate, lithium iodate, lithium niobate, silicon dioxide, strontium titanate, yttrium aluminium garnet or yttrium vanadate. In some examples, the first type of the particle, in the light diffusion layer, is titanium dioxide ($TiO_2$).

In some examples, the second type of inorganic particles, or secondary particles, have particle size that is from about 1.5 to about 3 times bigger than the size of the primary particles. The second type of the particles, or secondary particles, have thus a particle size that is ranging from about 800 nm to about 2 µm. In some other examples, the light diffusion layer (120) encompasses a second type of the particles, or secondary particles that have a refractive index (n) that is between 0.4 and 1.8. In some other examples, the second type of particles are inorganic pigments that include, but are not limited to, calcium carbonate, zeolite, silica, talc, alumina, aluminum trihydrate (ATH), calcium silicate, kaolin, calcined clay, and combinations or mixtures of any of these. In some other examples, the second type of the particles are calcium carbonate or a calcium carbonate mixture. The calcium carbonate may be one or more of ground calcium carbonate (GCC), precipitated calcium carbonate (PCC), modified GCC, and modified PCC. In some examples, the second type of the particles of the light diffusion layer are calcium carbonate particles.

In some examples, the light diffusion layer comprises a first type of inorganic particles which is titanium dioxide and a second type of inorganic particles which is calcium carbonate. The light diffusion layer can contains from about 80 wt % to about 98 wt % of a first type of the particles by total weight of the light diffusion layer. The light diffusion layer can contains from about 2 wt % to about 20 wt % of a second type of the particles by total weight of the light diffusion layer.

The light diffusion layer according to the present disclosure comprises a dispersing agent; which mean thus that the first type of particles or the second type of particles or both the first and second type of particles are dispersed with dispersants. Examples of suitable dispersants include, but are not limited to, water-soluble anionic species of low and high molecular weight such as phosphates and polyphosphates, carboxylates (such as oleic acid), polycarboxylates (such as acrylates and methacrylates). Other examples include hydrolysable alkoxysilanes with alkoxy group attached to water-soluble (hydrophilic) moieties such as water-soluble polyether oligomer chains. The dispersants can be reactive silane coupling agents containing hydrophilic functional groups, such as amino, diamino, triamino, ureido, poly(ether), mercapto, glycidol functional groups and their hydrolysis product. Examples of the silane coupling agents suitable as dispersants for metal oxides are (aminoethyl)aminopropyl-triethoxysilane, (aminoethyl) aminopropyl-trimethoxysilane, (aminoethyl)aminopropyl-methyldimethoxysilane, aminopropyl-triethoxysilane, aminopropyl-trimethoxysilane, glycidolpropyl-trimethoxysilane, ureidopropyltrimethoxysilane, and polyether triethoxysilane, polyether trimethoxysilane hydrolysis product of aminopropyl-trimethoxysilane, and hydrolysis product of (aminoethyl) aminopropyl-trimethoxysilane.

In some examples, the first type of particles or the second type of particles, or both the first and second type of particles, are dispersed with polyether alkoxysilanes dispersants. Polyether alkoxysilane dispersant can have the following general Formula (OR') (OR") (OR''')Si(PE)$R^4$ wherein R', R", and R''' are linear or branched alkyl groups. In some examples, R', R", and R''' are linear alkyl groups having from 1 to 3 carbon atoms in chain length. In some examples, R', R", and R'''—$CH_3$ or —$C_2H_5$. $R^4$ and PE are as described above for Formula (I); i.e. PE is a polyether oligomer chain segment of the structural formula: [($CH_2$)$_n$ —CH—R—O]$_m$, wherein n is an integer ranging from 0 to 3, wherein m is an integer superior or equal to 2, and wherein R is H or a chain alkyl group; and $R^4$ is hydrogen, or a linear or a branched alkyl group. In some examples, $R^4$ is $CH_3$ or $C_2H_5$.

Examples of organosilane dispersants include, for examples, gamma-aminopropyltriethoxy silane, monoamino silane, diamino silane, triamino silane, bis(2-hydroethyl)-3-aminopropyltriethoxysilane, 3-mercaptopropyltrimethoxysilane, 3-glycidoxypropyltrimethoxysilane, bis(triethoxysilylpropyl)disulfide, 3-aminopropyltriethoxysilane, bis-(trimethoxysilylpropyl)amine, N-phenyl-3-aminopropyltrimethoxysilane, N-aminoethyl-3-aminopropylmethyldimethoxysilane, 3-ureidopropyltrimethoxysilane, 3-methacryloxypropylt-rimethoxysilane, N-(trimethyloxysilylpropyl)isothiouronium chloride, N-(triethoxysilpropyl)-O-polyethylene oxide, 3-(triethoxylsilyl)propylsuccinic anhydride, or 3-(2- imidazolin-1-yl)propyltriethoxysilane, 3-aminopropyltrimethoxysilane, N-(2-aminoethyl-3-aminopropyltrimethoxysilane, 3-(triethoxysilylpropyl)-diethylenetriamine, poly(ethyleneimine)trimethoxysilane, aminoethylaminopropyl trimethoxysilane or aminoethylaminoethylaminopropyl trimethoxysilane. Commercial examples of the polyether alkoxysilane dispersants include, but are not limited to, Silquest® A-1230 manufactured by Momentive Performance Materials, and Dynasylan® 4144 manufactured by Evonik/Degussa.

In some examples, the light diffusion layer can contains from about 0.01 wt % to about 10 wt % of dispersants by total weight of the light diffusion layer. In some other examples, the light diffusion layer can contains from about 0.5 wt % to about 5 wt % of a dispersants by total weight of the light diffusion layer.

The light diffusion layer further contains a polymeric binder. Without being linked by any theory, it is believed that the polymeric binder is used to provide adhesion between the light diffusion layer and the base polymeric substrate. In some examples, the polymeric binder is present in the light diffusion layer in a ratio ranging from about 5 to 100 by dry parts of primary pigment to polymeric binder, or to a ratio of 30 to 100 by dry parts of primary pigment to polymeric binder. The polymeric binder can be either water a soluble, a synthetic or a natural substances or an aqueous dispersible substance like polymeric latex. In some other examples, the polymeric binder is polymeric latex. The polymeric binder can be a water soluble polymer or water dispersible polymeric latex. The binder may be selected from the group consisting of water-soluble binders and water dispersible polymers that exhibit high binding power for base paper stock and pigments, either alone or as a combination. In some examples, the polymeric binder components have a glass transition temperature (Tg) ranging from −10° C. to +50° C. The way of measuring the glass transition temperature (Tg) parameter is described in, for example, Polymer Handbook, 3rd Edition, authored by J. Brandrup, edited by E. H. Immergut, Wiley-Interscience, 1989.

Suitable binders include, but are not limited to, water soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers.

In some other examples, the binder component is a latex containing particles of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. Examples of binders include Poval®235, Mowiol®56-88, Mowiol®40-88 (products of Kuraray and Clariant).

The binder may have an average molecular weight (Mw) of about 5,000 to about 500,000. In some examples, the binder has an average molecular weight (Mw) ranging from about 100,000 to about 300,000. In some other examples, the binder has an average molecular weight of about 250,000. The average particle diameter of the latex binder can be from about 10 nm to about 10 μm; in some other examples, from about 100 nm to about 5 μm; and, in yet other examples, from about 500 nm to about 0.5 μm. The particle size distribution of the binder is not particularly limited, and either binder having a broad particle size distribution or binder having a mono-dispersed particle size distribution may be used.

The binder may include, but is in no way limited to latex resins sold under the name Hycar® or Vycar® (from Lubrizol Advanced Materials Inc.); Rhoplex® (from Rohm & Hass company); Neocar® (from Dow Chemical Comp); Aquacer® (from BYC Inc) or Lucidene® (from Rohm & Haas company).

In some examples, the binder is selected from natural macromolecule materials such as starches, chemical or biological modified starches and gelatins. The binder could be a starch additive. The starch additive may be of any type, including but not limited to oxidized, ethylated, cationic and pearl starch. In some examples, the starch is used in an aqueous solution. Suitable starches that can be used herein are modified starches such as starch acetates, starch esters, starch ethers, starch phosphates, starch xanthates, anionic starches, cationic starches and the like which can be derived by reacting the starch with a suitable chemical or enzymatic reagent. In some examples, the starch additives can be native starch, or modified starches (enzymatically modified starch or chemically modified starch). In some other examples, the starches are cationic starches and chemically modified starches. Useful starches may be prepared by known techniques or obtained from commercial sources. Examples of suitable starches include Penford Gum-280 (commercially available from Penford Products), SLS-280 (commercially available from St. Lawrence Starch), the cationic starch CatoSize 270 (from National Starch) and the hydroxypropyl No. 02382 (from Poly Sciences). In some examples, a suitable size press/surface starch additive is 2-hydroxyethyl starch ether, which is commercially available under the tradename Penford® Gum 270 (available from Penford Products).

In some examples, due to strong tendency of re-agglomeration of the nano particles due to change of ionic strength, the binder is a non-ionic binder. Examples of such binders are commercially available, for example, from Dow Chemical Inc. under the tradename Aquaset® and Rhoplex® emulsions, or are polyvinyl alcohol commercially available from Kuraray American Inc. under the tradename Poval®, Mowiol® and Mowiflex®.

Image Receiving Layer

The printable film of the present disclosure includes an image receiving layer (130). The image receiving layer, or inkjet receiving layer, will form a coating layer and is applied over the light diffusion layer (120) on the backside (102) of the film. In some examples, the image receiving layer is applied over light diffusion layer at a coat weight ranging from about 0.1 to about 40 gsm (gram per square meter), at a coat weight ranging or from about 1 to 20 gsm (gram per square meter). The image receiving layer would act as the image receiving layer since, during the printing process, the ink will be directly deposited on its surface. In some examples, the image receiving layer comprises, at least, a polymeric network, poly-alkene polymeric compounds and inorganic compounds.

In some other examples, the image receiving layer might further include a non-reactive polymeric substance. In some other examples, the image receiving layer might further include a water-soluble high-valence metal complex. In yet some other examples, the image receiving layer might further include an ionic polymeric compounds, i.e. a cationic polymeric compounds (positively charged) or an anionic polymeric compounds (negatively charged).

In some examples, the image receiving layer includes, at least, a polymeric network. The wording "polymer network" refers herein to a polymer and/or a polymer mixture which can be self-cross-linked, by reaction of different function groups in the same molecular chain, or inter-cross-linked by reaction with another compound which has different function group. In some examples, the polymeric network can be formed by using self-cross linked polyurethane polymers or cross-linkable polyglycidyl or polyoxirane resins. The polymeric network can be formed by using self-cross linked polyurethane polymers. The self-cross linked polyurethane polymer is formed by reacting an isocyanate with a polyol, where both isocyanates and polyols have average less than three end functional groups per molecule so that the polymeric network is based on a liner polymeric chain structure. The polyurethane chain can have a trimethyloxysiloxane group and cross-link action can take place by hydrolysis of the function group to form silsesquioxane structure. The polyurethane chain can also have an acrylic function group, and the cross-link structure can be formed by nucleophilic addition to acrylate group through acetoacetoxy functionality. In some other examples, the polymeric network is formed by using vinyl-urethane hybrid copolymers or acrylic-urethane hybrid polymers. In yet some other examples, the polymeric network includes an aliphatic polyurethane-acrylic hybrid polymer. Representative commercially available examples of the chemicals which can form a polymeric network include, but are not limited to, NeoPac® R-9000, R-9699 and R-9030 (from Zeneca Resins), Sancure® AU4010 (from Lubrizol) and Hybridur®570 (from Air Products).

The polymeric network can include a polymeric core that is, at least, one polyurethane. The polyurethanes include aliphatic as well as aromatic polyurethanes. The polyurethane is typically the reaction products of the following components: a polyisocyanate having at least two isocyanate (—NCO) functionalities per molecule with, at least, one isocyanate reactive group such as a polyol having at least two hydroxy groups or an amine. Suitable polyisocyanates include diisocyanate monomers, and oligomers. Examples of polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. In some other, the polyurethanes are aromatic polyether polyurethanes, aliphatic polyether polyurethanes, aromatic polyester polyurethanes, and aliphatic polyester polyurethanes. Representative commercially available examples of polyurethanes include Sancure®2710 and/or Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure®878, Sancure®815, Sancure®1301, Sancure®2715, Sancure®2026, Sancure®1818, Sancure®853, Sancure®830, Sancure®825, Sancure®776, Sancure®850, Sancure®12140, Sancure®12619, Sancure®835, Sancure®843, Sancure®898, Sancure®899, Sancure®1511, Sancure®1514, Sancure®1517®, Sancure®1591, Sancure®2255, Sancure®2260, Sancure®2310, Sancure®2725, and Sancure®12471 (all commercially available from Lubrizol Inc.). In some example, the polymeric network, is created by using cross-linkable polyglycidyl or polyoxirane resins. Cross-link reaction can take place either with themselves (through catalytic homopolymerisation of oxirane function group) or with the help of a wide range of co-reactants including polyfunctional amines, acids, acid anhydrides, phenols, alcohols, and thiols. Both polyglycidyl resin and co-reactants are compatible with the chemicals which form a polymeric network before curing in liquid state. The term "compatible" refers here to the fact that there is no significant phase separation after mixing in the room temperature.

In some examples, the polymeric network comprises epoxy-functional additives. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, gyro moieties, and the like. Examples of suitable epoxy functional resins are commercially available and include, without limitation, Ancarez® AR555 (commercially available from Air Products), Ancarez® AR550, Epi-rez®3510W60, Epi-rez®3515W6, or Epi-rez®3522W60 (commercially available from Hexion).

In some other examples, the polymeric network includes epoxy resin. Examples of suitable aqueous dispersions of epoxy resin include Waterpoxy® 1422 (commercially available from Cognis) or Ancarez® AR555 1422 (commercially available from Air Products). The polymeric network can comprise epoxy resin hardeners. The examples of epoxy resin hardeners that can be used herein include liquid aliphatic or cycloaliphatic amine hardeners of various molecular weights, in 100% solids or in emulsion or water and solvent solution forms. Amine adducts with alcohols and phenols or emulsifiers can also be envisioned. Examples of suitable commercially available hardeners include Anquawhite® 100 (from Air Products) and EPI-CURE® 8290-Y-60 (from Hexion). The polymeric network can include water-based polyamine as epoxy resin hardeners. Such epoxy resin hardeners can be, for examples, water-based polyfunctional amines, acids, acid anhydrides, phenols, alcohols and/or thiols.

Other examples of commercially available polymeric networks that can be used herein includes the ingredients Araldite® PZ 3921 and/or Aradur® 3985 available from Huntsman.

In some examples, the image receiving layer includes a polymeric network that is a hybrid network created by using self-cross linked polyurethane polymers and by using cross-linkable polyglycidyl or polyoxirane resins. In some other examples, the image receiving layer comprises a polymeric network that is created by using vinyl-urethane hybrid copolymers or acrylic-urethane hybrid polymers and water-based epoxy resins and water-based polyamines.

In some examples, the image receiving layer includes poly-alkene polymeric compounds. Such polymeric compounds can be considered as organic beads. By "poly-alkene compound", it is meant herein that the polymeric compound is made, for instance, from a poly-alkene homopolymer, a poly-alkene copolymer, a modified poly-alkene, a combination of two or more of the above-listed poly-alkenes, or a mixture of two or more thereof. By definition, a "poly-alkene" refers to a polymeric material formed via polymerization of an alkene monomer, i.e., $C_nH_{2n}$ and its derivatives, where n is within a range of about 7,000 to about 20,000. Examples of the polymers used to make the poly-alkene polymeric compounds include, but are not limited to, polyethylene homopolymer, polypropylene homopolymer, polytetrafluoroethylene (PTFE), polyamide, amide-modified polyethylene, amide-modified polypropylene, PTFE-modified polyethylene, PTFE-modified polypropylene, maleic anhydride-modified polyethylene, maleic anhydride-modified polypropylene, oxidized polyethylene, oxidized polypropylene, chloride polyethylene, chloride polypropylene, a combination of two or more of the above-listed poly-alkenes, or a mixture of two or more of the above-listed poly-alkenes.

The polymeric compounds can have a hardness value less than about 2 dmm, as measured by ASTM D-5 method. In some other examples, the compounds have a hardness value less than about 1, or less than about 0.5 dmm. In some examples, the size of the polymeric particles can be in the range of about 2 to about 40 μm. The poly-alkene polymeric compounds can have a hardness value, in dmm, which is within a range of about 0.1 to about 2, or about 0.1 to about 1.5. In some examples, the poly-alkene polymeric compounds are polytetrafluoroethylene (PTFE), polyamide or polyethylene polymer compounds. In some other examples, the poly-alkene polymeric compounds are polytetrafluoroethylene (PTFE), polyamide or polyethylene polymer compounds and have an average particle size be in the range of about 10 to about 60 μm. In yet some other examples, the polymeric compounds are polyamide polymers. The poly-alkene polymeric compounds can thus be polyamide particles that have a Vicat softening point ranging from about 100° C. to about 180° C., as measured by the Industrial standard ASTM D1525, and have a melting point ranging from about 100° C. to about 220° C., as measured by the industrial standard ISO3146.

The poly-alkene polymeric compounds can be present, in image receiving layer, in an amount representing from about 0.2 to about 30 dry parts, or from about 1 to about 20 dry parts, by total dry parts of the image receiving layer.

Representative commercially available examples of the poly-alkene polymeric compounds include, but are not limited to; Acumist® micronized polyolefin waxes by Honeywell; Slip-ayd® waxes by Elementis Specialties, and Licowax® waxes by Clariant, Germany. In some examples, the poly-alkene polymeric compounds are made from a micronized polyalkene compound dispersed in an aqueous solvent. The poly-alkene polymeric compounds can be available under the tradename Organsol® 2002ES3NAT3 (available from Arkema) or under the tradename Slip-ayd® SL300 (available from Elementis Specialties).

In some examples, the image receiving layer further comprises inorganic compounds. In some examples, the inorganic compounds have an average particle size in the range of about 0.05 to about 25 micrometers (μm, $10^{-6}$ m). In some other examples, the inorganic compounds have an average particle size in the range of about 0.1 to about 10 micrometers (μm). The amount of inorganic compound, in the image receiving layer, can be within the range of about 0.5 to about 30 wt % or within the range of about 1 to about 20 wt % or within the range of about 1 to about 15 wt % by total weight of the image receiving layer. Examples of inorganic compounds include but not limited to, calcium carbonate, zeolite, silica, talc, alumina, aluminum trihydrate (ATH), calcium silicate, kaolin, calcined clay, and combination or mixtures of any of these. Examples of inorganic compound, also includes, but are not limited to, ground calcium carbonate such as Hydrocarb® 60 available from Omya, Inc.; precipitated calcium carbonate such as Opacarb® A40 or Opacarb®3000 available from Specialty Minerals Inc. (SMI); clay such as Miragloss® available from Engelhard Corporation; synthetic clay such as hydrous sodium lithium magnesium silicate, such as, for example, Laponite® available from Southern Clay Products Inc., and titanium dioxide ($TiO_2$) available from, for example, Sigma-Aldrich Co. Examples of inorganic compound include, but are not limited to, compound, either existing in a dispersed slurry or in a solid powder, of polystyrene and its copolymers, polymethyacrylates and their copolymers, polyacrylates and their copolymers, polyolefins and their copolymers, such as polyethylene and polypropylene, a combination of two or more of the polymers. The inorganic compound may be chosen from silica gel (e.g., Silojet®703C available from Grace Co.), modified (e.g., surface modified, chemically modified, etc.) calcium carbonate (e.g., Omyajet® B6606, C3301, and 5010, all of which are available from Omya, Inc.), precipitated calcium carbonate (e.g., Jetcoat®30 available from Specialty Minerals, Inc.), and combinations thereof.

The image receiving layer can include a non-reactive polymeric substance. The term "non-reactive" refers herein to the fact that these polymeric substances are substantially not reactive with reactive the polymer network described previously. The word "substantially" means that the tendency, or reaction speed, of the reaction between the polymeric networks with the non-reactive polymeric substance is minimal comparing with self-cross-linking and inter cross-linking of the polymeric network. In some examples, the non-reactive polymeric substance can have an identical or similar monomer structure as corresponding polymer network, and, in some other examples, the non-reactive polymer can have a different monomer structure as corresponding polymer network. The non-reactive polymer substance can be a water soluble or water dispersible in a form of emulsion. In some example, the non-reactive polymer substances are aqueous based polymeric mixture. The term "aqueous polymeric mixture" is meant herein to include any hydrophilic or hydrophilic/hydrophobic blend of polymer material that soluble and/or dispersible to aqueous solvent to form a coating in accordance with examples of the present disclosure. The non-reactive polymeric substance can include ingredients which can form a continuous film and which can have strong binding power to the first treatment composition. The non-reactive polymeric substance can also include ingredients which can form a non-continuous film, or distributed compound inside of the polymer network. The non-reactive polymeric substance can include ingredients which can be a blend of film-forming polymers and of non-film-forming polymers.

The non-reactive polymeric substance can be present, in the image receiving layer, in an amount representing more than 2 parts by total parts of the image receiving layer. In some examples, the amount of the non-reactive polymeric substance can be within the range of about 2 to about 10 parts by total parts of the image receiving layer.

The non-reactive polymeric substance can be either a synthetic or a natural substances or an aqueous dispersible substance like polymeric latex. In some examples, the non-reactive polymeric substance is polymeric latex. The non-reactive polymeric substance can be a water soluble polymer or water dispersible polymeric latex or mixture. The non-reactive polymeric substance may be selected from the group consisting of water-soluble binders and water dispersible polymers that exhibit high binding power to first treatment layer. In some examples, the non-reactive polymeric substance have a glass transition temperature (Tg) ranging from −10° C. to +50° C. The way of measuring the glass transition temperature (Tg) parameter is described in, for example, Polymer Handbook, 3rd Edition, authored by J. Brandrup, edited by E. H. Immergut, Wiley-Interscience, 1989.

Suitable non-reactive polymeric substance include, but are not limited to, water soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer and copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers. In some other examples, the binder component is a latex containing compound of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinyl-chloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; acetoacetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. Examples of binders include Poval®235, Mowiol®56-88, Mowiol®40-88 (products of Kuraray and Clariant).

The non-reactive polymeric substance may have an average molecular weight (Mw) of about 5,000 to about 500,000. In some examples, the binder has an average molecular weight (Mw) ranging from about 100,000 to about 300,000. In some other examples, the binder has an average molecular weight of about 250,000. The average particle diameter of the latex binder can be from about 10 nm to about 10 µm; in some other examples, from about 100 nm to about 5 µm; and, in yet other examples, from about 500 nm to about 0.5 µm. The particle size distribution of the binder is not particularly limited, and either binder having a broad particle size distribution or binder having a mono-dispersed particle size distribution may be used. The binder may include, but is in no way limited to latex resins sold under the name Hycar® or Vycar® (from Lubrizol Advanced Materials Inc.); Rhoplex® (from Rohm & Hass company); Neocar® (from Dow Chemical Comp); Aquacer® (from BYC Inc) or Lucidene® (from Rohm & Haas company).

In some examples, the non-reactive polymeric substance is selected from natural macromolecule materials such as starches, chemical or biological modified starches and gelatins. The non-reactive polymeric substance could be a starch additive. The starch additive may be of any type, including but not limited to oxidized, ethylated, cationic and pearl starch. In some examples, the starch is used in an aqueous solution. Suitable starches that can be used herein are modified starches such as starch acetates, starch esters, starch ethers, starch phosphates, starch xanthates, anionic starches, cationic starches and the like which can be derived by reacting the starch with a suitable chemical or enzymatic reagent. In some examples, the starch additives can be native starch, or modified starches (enzymatically modified starch or chemically modified starch). In some other examples, the starches are cationic starches and chemically modified starches. In yet some other examples, the starch is used in a form of nano-sized dispersed slurry. Useful starches may be prepared by known techniques or obtained from commercial sources. Examples of suitable starches include Penford Gum-280 (commercially available from Penford Products), SLS-280 (commercially available from St. Lawrence Starch), the cationic starch CatoSize 270 (from National Starch) and the hydroxypropyl No. 02382 (from Poly Sciences). In some examples, a suitable size press/surface starch additive is 2-hydroxyethyl starch ether, which is commercially available under the tradename Penford® Gum 270 (available from Penford Products). In some other examples, a suitable starch is nano sized bio-starch, which is commercially available under the tradename Ecosphere 2202®.

The water-soluble polymer binder can be available under the tradename PrintRite® DP376, DP350, DP351, DP675, DP261, DP218E, Hycar 26172 (all available from Lubrizol).

The image receiving layer may further include a water-soluble high-valence metal complex. The water-soluble high-valence metal complex can be used in an amount representing from about 0.1 parts to 20 parts (dry parts), or from 0.5 parts to 10 parts (dry parts) by total dry parts of the image receiving layer. Such water-soluble high-valence metal complex can be a water-soluble compound containing high-valence metallic ion, a water-soluble cationic high-valence metallic complex or a water-soluble cationic polymeric compounds containing high-valence metallic ion. Water-soluble high-valence metallic ions can be high-valence metallic cation or anion. Suitable cation species can include one or more of Group II metals, Group III metals or transition metals from the period table, such as, for instance, calcium, copper, nickel, zinc, magnesium, barium, iron, aluminum and chromium ions. Anion species can include one or more of chloride, iodide, bromide, nitrate, sulfate, sulfite, phosphate, chlorate, and acetate.

In some examples, in the image receiving layer, the water-soluble high-valence metal complex is a water-soluble aluminum salt. In some other examples, the water-soluble high-valence metal complex is a water-soluble trivalent aluminum salt. Examples of such salts include aluminum acetate, aluminum bromate, aluminum bromide and the hexa- and pentadecyl hydrates thereof, aluminum ammonium sulfate, aluminum sodium sulfate, aluminum chlorate, aluminum citrate, aluminum chloride and the hexahydrate thereof, aluminum fluoride, aluminum iodide and the hexahydrate thereof, aluminum lactate, aluminum nitrate, aluminum stearate, aluminum sulfate, aluminum tartrate, aluminum triformate, aluminum formo-acetate and the hydrate.

The water-soluble high-valence metal complex can be a water-soluble cationic high-valence metallic complex. Such water-soluble cationic high-valence metallic complex can be a charged complex ion derived from a metal complex with coordinate covalent bonds or dative covalent bonds. The coordination number is defined by the number of ligand(s) attached to the central metal ion, and may range from two to nine, or even more. The ligands can be small polar molecules, such as $H_2O$ and $NH_3$, or can be anions such as $Cl^-$, $OH^-$ and $S^{2-}$. Examples of water-soluble high-valence metal complexes include $[Al(H_2O)_6]^{3+}$, $[Al(H_2O)_3(OH)_3]$, $[Al(H_2O)_2(OH)_4]$, and $[Al(H_2O)_4(OH)_2]$. Other examples include potassium sulfate dodecahydrate or aluminum sulfate octadeca hydrate. Alternatively, the metal complex can include two or more central atoms, also referred to as polynuclear complexes, which can be formed when a ligand donates electron pairs to two or more metal ions simultaneously and then acts as bridge between the multiple central ions. In some examples, the charged complex ions can be octa-aquo-dioxodialuminim $(iV)^{4+}$, $Al_8(OH)_{20}^{4+}$ or $[Al_8(OH)_{10}(SO_4)_5]^{4+}$.

The image receiving layer might also further include an ionic polymeric compounds, i.e. a cationic polymeric compounds (positively charged) or an anionic polymeric compounds (negatively charged). The ionic polymeric compound can be a water-soluble cationic polymeric compound containing high-valence metallic ion. Examples of such cationic polymer include: poly-diallyl-dimethyl-ammonium chloride, poly-diallyl-amine, polyethylene imine, poly2-vinylpyridine, poly 4-vinylpyridine poly2-(tert-butylamino) ethyl methacrylate, poly 2-aminoethyl methacrylate hydrochloride, poly 4'-diamino-3,3'-dinitrodiphenyl ether, poly N-(3-aminopropyl)methacrylamide hydrochloride, poly 4,3, 3'-diaminodiphenyl sulfone, poly 2-(iso-propylamino)ethylstyrene, poly2-(N,N-diethylamino)ethyl methacrylate, poly 2-(diethylamino)ethylstyrene, and 2-(N,N-dimethylamino) ethyl acrylate.

In addition to the above-described components, the image receiving layer might contain other components or additives. The additives include, but are not limited to, one or more of rheology modifiers, thickening agents, cross-linking agents, surfactants, defoamers, optical brighteners, dyes, pH controlling agents or wetting agents, and dispersing agents, for example. The total amount of additives, in the composition for forming the treatment composition, can be from about 0.1 wt % to about 10 wt % or from about 0.2 wt % to about 5 wt %, by total dry weight of the treatment composition.

Method for Forming a Printable Film

In some examples, according to the principles described herein, a method of making a printable film comprising a polymeric film substrate (110), a light diffusion layer (120) and an image receiving layer (130) is provided. Such method encompasses providing a polymeric film substrate with a front side and a backside; applying a light diffusion layer that contains inorganic particles, dispersing agents and polymeric binders on the backside of the polymeric film substrate; coating an image receiving layer over said light diffusion layer; and drying the coatings in order to obtain a printable film. A tie layer can be applied to the polymeric film substrate.

In some examples, before apply any coating to the base layer, a corona treatment may be done to polymeric film substrate (110). The polymeric film substrate can thus be pre-treated in corona chamber at room temperature and atmosphere. In another implementation, the polymeric film substrate can be pre-washed with a $H_2SO_4$ solution or other oxidant solutions of 30-50% concentration by weight. In some examples, the method of making a printable film comprises providing a polymeric film substrate with a front side and a backside; performing a corona treatment, applying a light diffusion layer that contains inorganic particles, dispersing agents and polymeric binders on the backside of the polymeric film substrate; coating an image receiving layer over said light diffusion layer; and drying the coatings in order to obtain a printable film. In some other examples, the method of making a printable film comprises providing a polymeric film substrate with a front side and a backside that comprises a tie layer; performing a corona treatment, applying a light diffusion layer that contains inorganic particles, dispersing agents and polymeric binders on the backside of the polymeric film substrate; coating an image receiving layer over said light diffusion layer; and drying the coatings in order to obtain a printable film.

In some examples, the light diffusion layer is disposed on the polymeric base film substrate and forms a layer having a coat-weight in the range of about 0.1 to about 20 gram per square meter per side. In some other examples, an image receiving layer is disposed over the light diffusion layer, and forms an image receiving layer having a coat-weight in the range of about 0.1 to about 40 gram per square meter per side.

FIG. 3 is a flow chart of a method (200) for making the printable film according to the present disclosure. In this method, a polymeric base film is provided (201) as the supporting base; then a light diffusion layer is applied (202) on one side of the polymeric base film; and, then, an image receiving layer is applied (203) over the light diffusion layer. The light diffusion layer (120) and the image receiving layer (130) are both applied on the one side of the film substrate (110). The other side does not contain any coating. The light diffusion layer (120) and the image receiving layer (130) can be applied to the film substrate (110) by using one of a variety of suitable coating methods, for example slot die coating, blade coating, air knife coating, metering rod coating, curtain coating, or another suitable technique. For example, the light diffusion layer may be applied using a conventional off-line coater, such as gate-roll metering, blade metering, Meyer rod metering, or slot metering. The image receiving layer (130) is applied over the light diffusion layer (120), using the coating method described above. In some examples, after the coating steps, the media might go through a drying process to remove water and other volatile components present in the layers and substrate. The drying pass may comprise several different drying zones, including, but not limited to, infrared (IR) dryers, hot surface rolls, and hot air floatation boxes.

Method for Producing Printed Images

A method for producing printed images, or printing method, that includes providing a printable film such as defined herein; applying an ink composition on the ink receiving coating layer of the print media, to form a printed image; and drying the printed image in order to provide, for example, a printed image with enhanced quality, is provided herein. The printable film contains at least, a polymeric film substrate as a supporting substrate; a light diffusion layer and an image receiving layer. In some examples, the printing method for producing images is an inkjet printing method. By inkjet printing method, it is meant herein a method wherein a stream of droplets of ink is jetted onto the recording substrate or media to form the desired printed image. The ink composition may be established on the recording media via any suitable inkjet printing technique. Examples of inkjet method include methods such as a charge control method that uses electrostatic attraction to eject ink, a drop-on-demand method which uses vibration pressure of a Piezo element, an acoustic inkjet method in which an electric signal is transformed into an acoustic beam and a thermal inkjet method that uses pressure caused by bubbles formed by heating ink. Non-limitative examples of such inkjet printing techniques include thus thermal, acoustic and piezoelectric inkjet printing. In some examples, the ink composition is applied onto the recording media using inkjet nozzles. In some other examples, the ink composition is applied onto the recording method using thermal inkjet printheads.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in order to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition, applied to the printable film is an ink composition containing latex components. Latex components are, for examples, polymeric latex particulates. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have an average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

The printed image may be dried after printing. The drying stage may be conducted, by way of illustration and not limitation, by hot air, electrical heater or light irradiation (e.g., IR lamps), or a combination of such drying methods. In order to achieve best performances, it is advisable to dry the ink at a maximum temperature allowable by the print media that enables good image quality without deformation. Examples of a temperature during drying are, for examples, from about 60° C. to about 205° C., or from about 120° C. to about 180° C. The printing method may further include a drying process in which the solvent (such as water), that can be present in the ink composition, is removed by drying. As a further step, the printable recording media can be submitted to a hot air drying systems.

EXAMPLES

Ingredients

The raw materials and chemical components used in the illustrating samples are listed in Table 1.

TABLE 1

| Ingredient name | Nature of the ingredient | Supplier |
|---|---|---|
| Hydrocarb ®H95 | Inorganic particles - Calcium carbonate | Omya Inc |
| TI4-OX-02-P | Inorganic particles - Titanium Oxide | American Elements |
| Araldite ® PZ 3901 | polymeric network - epoxy resin | Air Products |
| Slip-ayd ® SL 300 | poly-alkene polymeric compound | Elementis Specialties |
| Acronal ® 866 | styrene-acrylic binder | BASF Corporation |
| Rovene ®4040 | non-reactive polymeric substance | Lubrizol |
| Aradur ® 3985 | epoxy resin hardeners | Air Products |
| Tegowet 510 | Surfactant | Evonik |
| BYK ® 024 | Deformer | BYK Inc |
| Irgalite ® Violett | Dye | BASF Corporation |
| Irgalith Blau ® | Dye | BASF Corporation |

Example 1—Preparation of Film Samples

Several polyethylene terephthalate (PET) base film substrate are prepared (Examples base substrates 1 to 4). Some of polymeric film substrates are treated with a corona treatment (Exp. Base 2 and 4), some of these polymeric film substrates further comprise a tie layer (a copolymer emulsion of butyl acrylate-ethyl acrylate copolymer) which is applied at a thickness representing from about 0.2 to about 0.5 micrometer (μm). The different polymeric film substrates are illustrated in Table 2. The scratch resistance of each polymeric film is evaluated.

TABLE 2

| Polymeric film substrate | Base film | Corona treatment | Tie layer | Scratch test |
|---|---|---|---|---|
| Exp. Base 1 | PET | No | No | Poor |
| Exp. Base 2 | PET | Yes | No | Good |
| Exp. Base 3 | PET | No | Yes | Good |
| Exp. Base 4 | PET | Yes | Yes | Very good |

A light diffusion layer composition is then applied to the polymeric film substrate (Exp. Base 4) at different coat weight in order to have different samples (Sample A, B and C) having different opacity such as illustrated in Table 3.

TABLE 3

| Sample ID | Polymeric film substrate | Coat weight (gsm) | Opacity (%) |
|---|---|---|---|
| Sample A | Exp. Base 4 | 8.5 | 45 |
| Sample B | Exp. Base 4 | 20.9 | 65 |
| Sample C | Exp. Base 4 | 30.0 | 74 |

The composition of the light diffusion layer is illustrated in Table 4 below. Both first and secondary particles (respectively, Titanium dioxide and Calcium carbonate) are pretreated with gamma-amino-propyltriethoxy silane.

TABLE 4

| Light diffusion layer | |
|---|---|
| Tradename/ingredients | Parts by dry weight |
| TI4-OX-02-P | 95 |
| Hydrocarb ® 95 HS | 5 |
| Acronal ® 866 | 18 |
| BYK ® 024 | 1 |
| Tegowet ® 510 | 0.5 |
| Irgalite ® Violett | 0.03 |
| Irgalith Blau ® | 0.066 |

Several image receiving layers (Exp. IR 1 to IR. 4) are formulated as illustrated in the Table 5 below.

TABLE 5

| Image receiving layer formulation (in Parts by dry weight) | | | | |
|---|---|---|---|---|
| Tradename/ingredients | Exp. IR1 | Exp. IR2 (comp.) | Exp. IR3 (comp.) | Exp. IR4 (comp.) |
| Araldite ® PZ 3901 | 11 | 17 | 0 | 13 |
| Aradur ® 3985 | 14 | 22 | 0 | 16 |
| Rovene ®4040 | 18 | 0 | 24 | 20 |
| Slip ady ®SL 300 | 11 | 17 | 23 | 0 |
| Hydrocarb ®H95 | 28 | 44 | 59 | 66 |
| BYK 024 | 1 | 1 | 1 | 1 |
| Tegowet 510 | 0.5 | 0.5 | 0.5 | 0.5 |
| Irgalite Violett | 0.03 | 0.03 | 0.03 | 0.03 |
| Irgalith Blau | 0.066 | 0.066 | 0.066 | 0.066 |

Several printable film comprising a polymeric film substrate; a light diffusion layer and an image receiving layer are produced by applying 7 gsm of light diffusion layer having the formulation illustrated in Table 4 and 10 gsm of different image receiving layer (Exp. IR1, IR2, IR3 or IR4 as exemplified in Table 5). The Composition of these samples 1 to 6 are illustrated in the Table 6.

Example 2—Samples Performances

All printable film samples (1 to 6) are printed using an HP DesignJet L26500 printer equipped with HP 792 latex inks, using a six color process at 110° C. and at a speed of 100 square feet per hour (a 10 pass bidirectional color profile). An image is created on each sample with an equal percentage of each of the six ink colors. A final visual appearance of the image is a grey-looking area on the samples. The printed films are then evaluated for different performances: opacity, scrubbability, and image quality. The result of these tests are summarized in Tables 6 and 7.

The Scrubbability test is performed by exposing the various samples to be tested to a dull edge (like a coin) and to a sharp edge (like a plastic nail) in a BYK Abrasion Tester (from BYK-Gardner USA, Columbus, Md.). After the test is concluded, the samples are rated visually using scale from 1 to 5 (very poor to excellent). Image quality is evaluated using both numeric measurement method and visual evaluation method. The first method involves printing standardized diagnostic images onto the said printing film, then numerically measuring gamut/color saturation, ink bleed, coalescence, text clarity, ink dry time, and gloss level, using spectrophotometer (such as the X-Rite i1/i0) and single-angle gloss-meter (such as the BYK Gloss-meter). Visual evaluations are done in a light box under standard lighting box conditions, with the image at a known distance & viewing angle. The attributes under visual evaluation are color gamut, area fill uniformity for defects such as coalescence, mottle grain.

TABLE 6

| Printable film Samples | Base substrate and Light diffusion layer | Image receiving layer | Visual check under back lighting |
|---|---|---|---|
| SAMPLE 1 | Sample A | Exp. IR 1 | Transparent |
| SAMPLE 2 | Sample B | Exp. IR 1 | Good with screened lighting but slightly transparent w/o screen lighting |
| SAMPLE 3 | Sample C | Exp. IR 1 | Optimized opacity and Image Quality |
| SAMPLE 4 (comparative) | Sample C | Exp. IR 2 | See Table 7 |
| SAMPLE 5 (comparative) | Sample C | Exp. IR 3 | See Table 7 |
| SAMPLE 6 (comparative) | Sample C | Exp. IR 4 | See Table 7 |

TABLE 7

| Test Results | SAMPLE 3 | SAMPLE 4 Comparative | SAMPLE 5 Comparative | SAMPLE 6 Comparative |
|---|---|---|---|---|
| Image quality | 5 | 3 | 5 | 5 |
| Scrubbability | 5 | 5 | 2 | 3 |

The invention claimed is:

1. A printable film comprising:
   a. a polymeric film substrate with a front side and a backside,
   b. a light diffusion layer, applied on the backside of the polymeric film substrate, which contains inorganic particles, dispersing agents and polymeric binders;
   c. and an image receiving layer applied over the light diffusion layer on the backside of the polymeric film substrate.

2. The printable film of claim 1 wherein the polymeric film substrate contains, at least, polymeric substances that are poly-alkene compounds.

3. The printable film of claim 1 wherein the polymeric film substrate is a polyethylene terephthalate (PET) film substrate.

4. The printable film of claim 1 wherein the polymeric film substrate further comprise a tie layer.

5. The printable film of claim 1 wherein the light diffusion layer contains at least two different type of inorganic particles, a dispersing agent and a polymeric binder.

6. The printable film of claim 5 wherein the light diffusion layer has an opacity that is ranging from about 50 to about 95.

7. The printable film of claim 5 wherein the light diffusion layer encompasses a first type of inorganic particles that have a refractive index (n) that is superior or equal to 1.8.

8. The printable film of claim 5 wherein the light diffusion layer encompasses a second type of inorganic particles that have a refractive index (n) that is between 0.4 and 1.8.

9. The printable film of claim 5 wherein the light diffusion layer comprises a first type of inorganic particles which is titanium dioxide and a second type of inorganic particles which is calcium carbonate.

10. The printable film of claim 1 wherein the light diffusion layer comprises dispersants that are reactive silane coupling agents containing hydrophilic functional groups.

11. The printable film of claim 1 wherein the image receiving layer comprises, at least, a polymeric network, poly-alkene polymeric compounds and inorganic compounds.

12. The print medium of claim 11 wherein the polymeric network, in the image receiving layer, is formed by using vinyl-urethane hybrid copolymers or acrylic-urethane hybrid polymers.

13. The print medium of claim 11 wherein the poly-alkene polymeric compounds, in the image receiving layer, are polytetrafluoroethylenes, polyamide or polyethylene polymer particles.

14. A printable recording media having a polyethylene terephthalate base film, with a tie layer which is a copolymer emulsion of butyl acrylate-ethyl acrylate, and that has been through a corona treatment; a light diffusion layer, and an image receiving layer applied over the light diffusion layer on the backside of the base film.

15. A method for forming a printable film comprising:
   a. providing a polymeric film substrate with a front side and a backside,
   b. applying a light diffusion layer that contains inorganic particles, dispersing agents and polymeric binders on the backside of the polymeric film substrate,
   c. coating an image receiving layer over said light diffusion layer,
   d. and drying the coatings in order to obtain a printable film.

* * * * *

UNITED STATES PATENT AND TRADEMARK OFFICE
CERTIFICATE OF CORRECTION

PATENT NO. : 10,040,306 B2
APPLICATION NO. : 15/564400
DATED : August 7, 2018
INVENTOR(S) : Xiaoqi Zhou et al.

Page 1 of 1

It is certified that error appears in the above-identified patent and that said Letters Patent is hereby corrected as shown below:

In the Claims

In Column 24, Line 21 approx., Claim 12, delete "print medium" and insert -- printable film --, therefor.

In Column 24, Line 25, Claim 13, delete "print medium" and insert -- printable film --, therefor.

Signed and Sealed this
First Day of January, 2019

Andrei Iancu
*Director of the United States Patent and Trademark Office*